(12) United States Patent
García Ayerra et al.

(10) Patent No.: US 11,668,276 B2
(45) Date of Patent: Jun. 6, 2023

(54) ELECTRICAL CONNECTION SYSTEM FOR A WIND TURBINE BLADE, WIND TURBINE AND RELATED METHOD

(71) Applicant: Siemens Gamesa Renewable Energy Innovation & Technology S.L., Sarriguren (ES)

(72) Inventors: Fernando García Ayerra, Pamplona (ES); Olimpio Guerrero Buitrago, Navarra (ES); Joan Pau Guilera de Gispert, Sarriguren (ES); Victor March Nomen, Les Fonts (ES)

(73) Assignee: SIEMENS GAMESA RENEWABLE ENERGY INNOVATION & TECHNOLOGY S.L.

( * ) Notice: Subject to any disclaimer, the term of this patent is extended or adjusted under 35 U.S.C. 154(b) by 243 days.

(21) Appl. No.: 16/897,365

(22) Filed: Jun. 10, 2020

(65) Prior Publication Data
US 2020/0408190 A1    Dec. 31, 2020

(30) Foreign Application Priority Data

Jun. 26, 2019  (EP) .................................. 19380012

(51) Int. Cl.
*F03D 1/06* (2006.01)
*B29C 70/52* (2006.01)
(Continued)

(52) U.S. Cl.
CPC ............ *F03D 1/0675* (2013.01); *B29C 70/52* (2013.01); *B29C 70/685* (2013.01); *F03D 80/30* (2016.05);
(Continued)

(58) Field of Classification Search
CPC ...... F03D 1/0675; F03D 1/0683; F03D 80/30; B29C 70/52; B29C 70/685;
(Continued)

(56) References Cited

U.S. PATENT DOCUMENTS

2014/0003956 A1   1/2014  Lull et al.
2016/0138569 A1*  5/2016  Caruso ................. F03D 1/0633
                                                156/60
(Continued)

FOREIGN PATENT DOCUMENTS

CN   105619844 A    6/2016
CN   205805824 U   12/2016
(Continued)

OTHER PUBLICATIONS

European Search Report dated Dec. 20, 2019 for Application No. 19380012.5.

*Primary Examiner* — Justin D Seabe
*Assistant Examiner* — Sang K Kim
(74) *Attorney, Agent, or Firm* — Schmeiser, Olsen & Watts LLP

(57) ABSTRACT

Provided is an electrical connection system for a wind turbine blade that allows sharing the current between all conductors, in order to avoid voltage differences between them, avoiding internal sparks between pultruded plates, in a spar cap of the wind turbine blade. A second aspect is a wind turbine which in turn includes the wind turbine blade including the electrical bonding system. A third aspect is a method for electrically connecting conductive caps in a wind turbine blade.

20 Claims, 4 Drawing Sheets

(51) Int. Cl.
*B29C 70/68* (2006.01)
*F03D 80/30* (2016.01)
*B29K 105/12* (2006.01)
*B29K 307/04* (2006.01)
*B29L 31/08* (2006.01)
*B29L 31/36* (2006.01)

(52) U.S. Cl.
CPC ...... *B29K 2105/12* (2013.01); *B29K 2307/04* (2013.01); *B29L 2031/085* (2013.01); *B29L 2031/36* (2013.01)

(58) Field of Classification Search
CPC ............ B29K 2105/12; B29K 2307/04; B29L 2031/085; B29L 2031/36
See application file for complete search history.

(56) References Cited

U.S. PATENT DOCUMENTS

| | | | |
|---|---|---|---|
| 2016/0146185 A1* | 5/2016 | Yarbrough | B32B 5/22 156/242 |
| 2016/0221272 A1* | 8/2016 | Koefoed | B29C 70/02 |
| 2017/0082089 A1 | 3/2017 | Yarbrough et al. | |
| 2018/0156202 A1 | 6/2018 | Lipka et al. | |
| 2022/0003215 A1* | 1/2022 | Thwaites | B29D 99/0025 |
| 2022/0055323 A1 | 2/2022 | Suselbeek et al. | |

FOREIGN PATENT DOCUMENTS

| | | |
|---|---|---|
| CN | 113423550 A | 9/2021 |
| EP | 3020958 A1 | 5/2016 |
| EP | 3026259 A1 | 6/2016 |

* cited by examiner

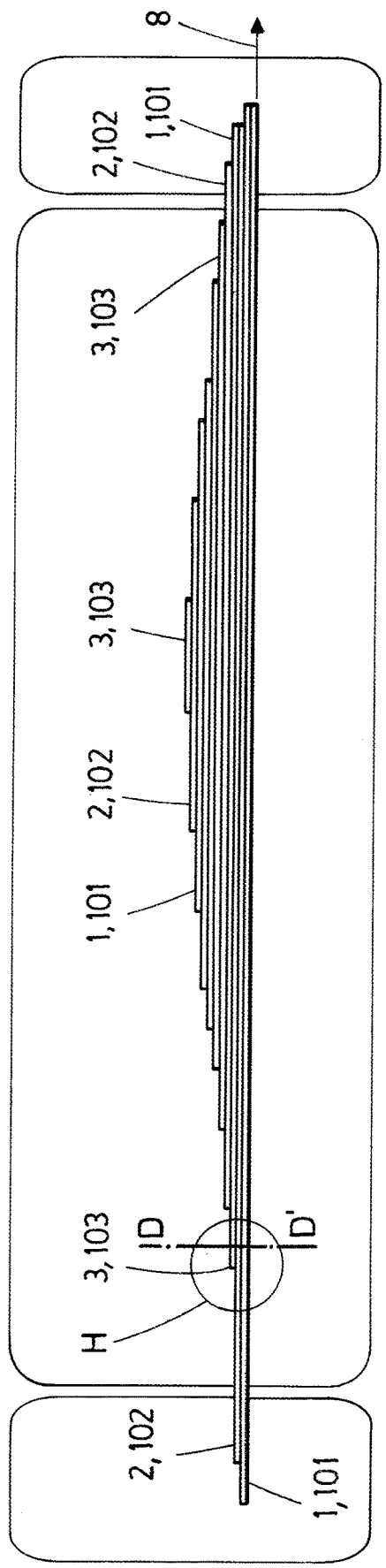
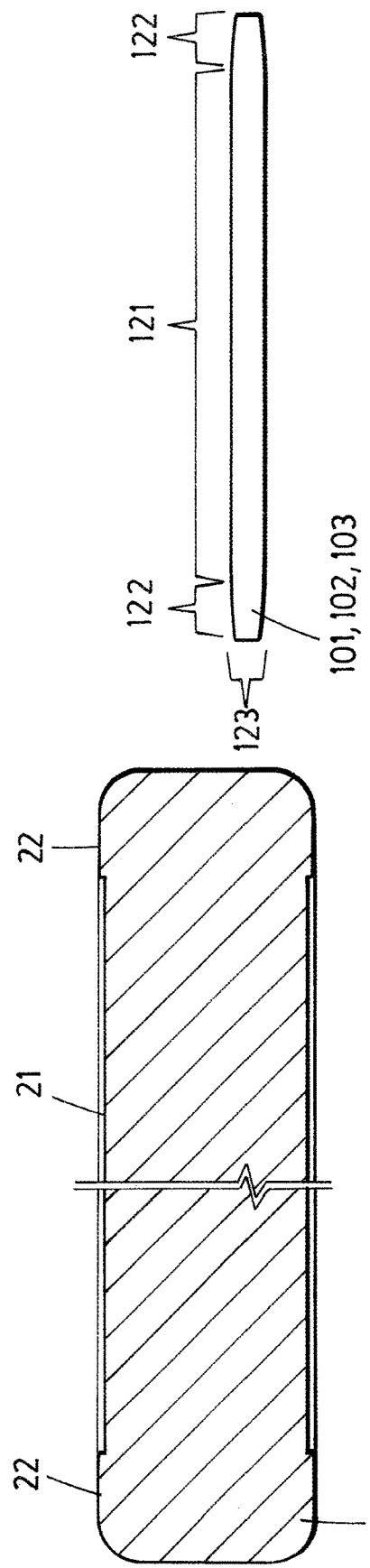

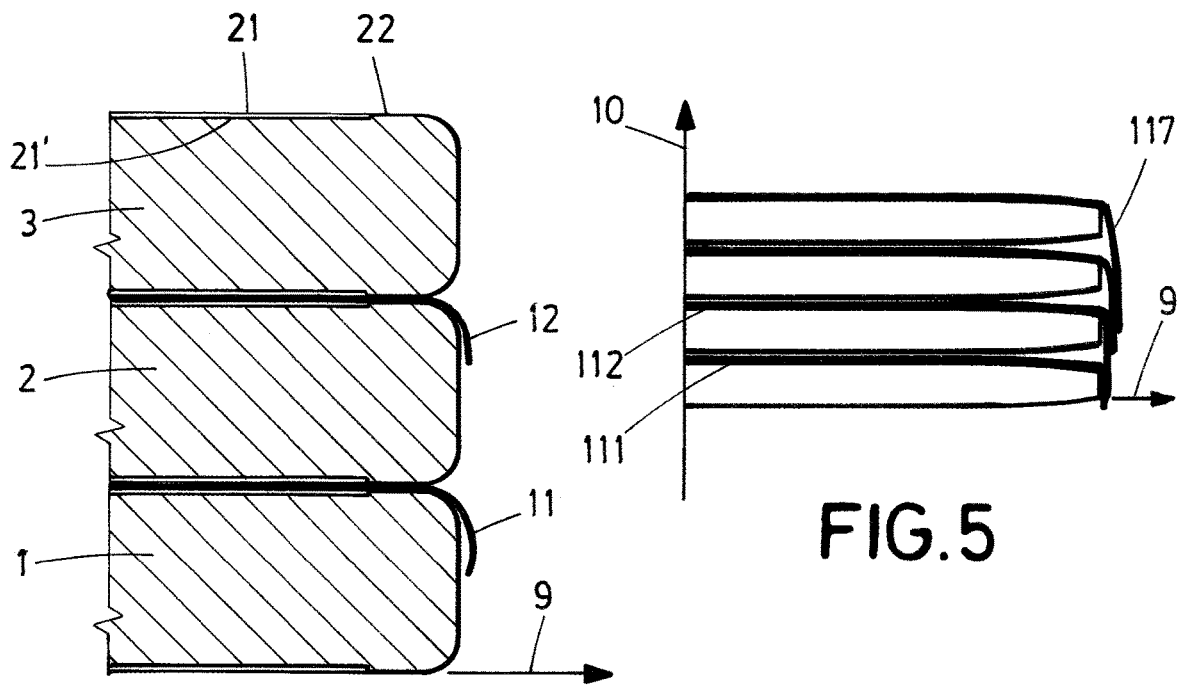
FIG.4
FIG.5
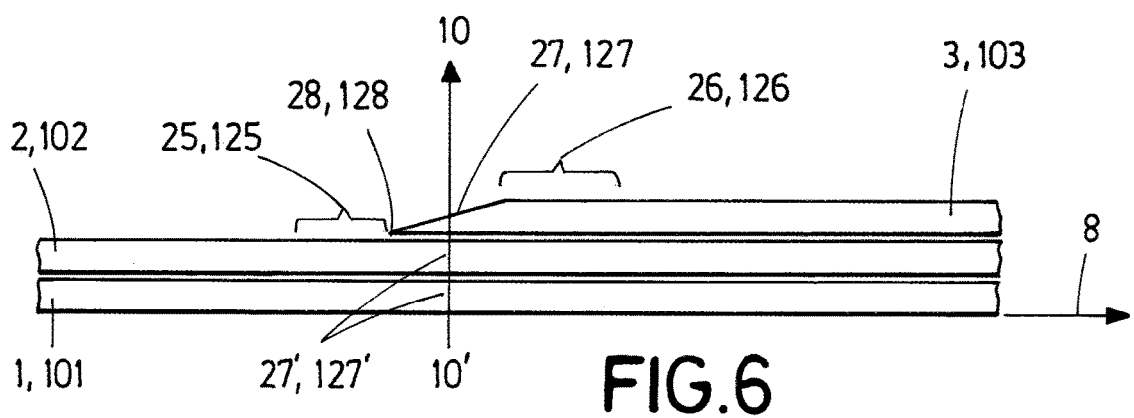
FIG.6
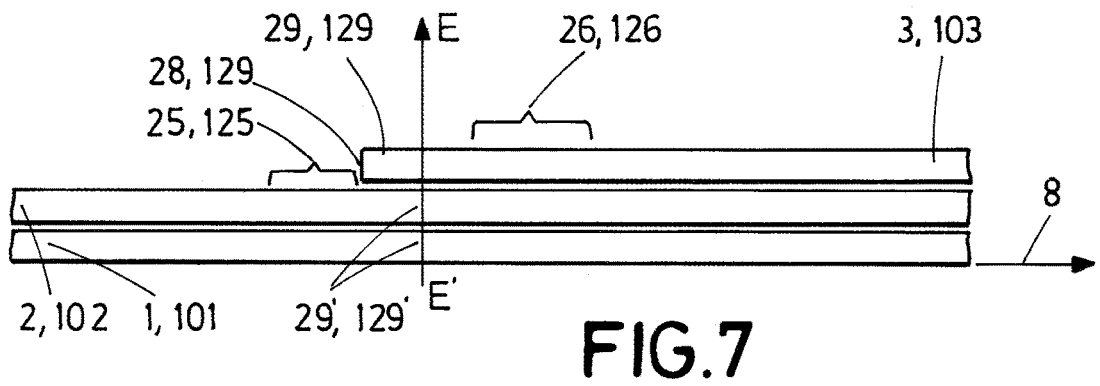
FIG.7

ELECTRICAL CONNECTION SYSTEM FOR A WIND TURBINE BLADE, WIND TURBINE AND RELATED METHOD

CROSS-REFERENCE TO RELATED APPLICATIONS

This application claims priority to European Application No. 19380012.5, having a filing date of Jun. 26, 2019, the entire contents of which are hereby incorporated by reference.

FIELD OF TECHNOLOGY

The following relates to an electrical connection system for a wind turbine blade that allows sharing the current between all conductors, in order to avoid voltage differences between them, avoiding internal sparks between pultruded plates, preferably in a spar cap of the wind turbine blade.

A second aspect of the invention is a wind turbine which in turn comprises the wind turbine blade comprising the electrical bonding system.

A third aspect of the invention is a method for electrically connecting conductive elements which are part of a cap in a wind turbine blade.

BACKGROUND

It is known in the state of the art document US20180156202A1 that discloses a spar cap assembly for a wind turbine rotor blade with a carbon fiber-reinforced spar cap, a lightning conductor, which extends along the spar cap, and an equipotential bonding element, which connects the spar cap and the lightning conductor together electrically conductively, wherein the spar cap includes a plurality of layers of pultruded semi-finished products and the equipotential bonding element comprises a sheet of a carbon fiber material, which rests against an end face of an end on the blade root side of one of the pultruded semi-finished products and against an end face of an end on the blade tip side of one of the pultruded semi-finished products.

However, the plurality of layers of pultruded semi-finished products are not good conductors compared to metals. Their linear conductivity being three orders of magnitude lower than copper, promotes a high voltage difference because of Ohm's law during flow of lightning currents. This voltage difference between conductors can create electrical discharges between these conductors of pultruded semi-finished products of the same spar cap assembly.

Also, carbon cap assemblies comprise multiple pultruded semi-finished products of different length due to structural reasons. Besides, pultruded semi-finished products are made of a given thickness, being the same or different from all of them.

Lightning current when injected to the spar cap it is shared by all the conductors and needs to be shared every time a pultruded semi-finished product is added at the top. That is every time the total cross-section of the spar cap is modified. Bigger cross-sections occur for sections at the mid-span region of then blade while smaller cross-sections occur for sections at an end region corresponding to the tip of the blade. Thus, current flowing through the spar is the same (the total Amperes), but not the current density (Amperes/mm2) which depends on the specific radius. It creates flows of current "upwards" (i.e., to the pultruded semi-finished product added at the top), as the current is injected and collected at the ends of the spar cap, this leading to internal sparks between the pultruded semi-finished products.

The applicant doesn't know any electrical connection system for a wind turbine blade which solves the above-mentioned drawbacks.

The electrical connection system for a wind turbine blade and the related method of the present invention solve the above cited drawbacks providing an electrical connection system for a wind turbine blade which prevents voltage differences between carbon laminates that make up and provides a homogeneous current distribution along discrete cross-sections.

SUMMARY

An aspect relates to a wind turbine which in turn comprises the wind turbine blade comprising the electrical bonding system.

An aspect of embodiments of the invention is a method for electrically connecting conductive elements which are part of a cap in a wind turbine blade.

Embodiments of the present invention relate to an electrical connection system for a wind turbine blade that allows sharing the current between all conductors, in order to avoid voltage differences between them, avoiding internal sparks between pultruded plates, preferably in a spar cap of the wind turbine blade.

The electrical connection system for a wind turbine blade comprises:
    a spar cap assembly which in turn comprises:
        at least one set of carbon pultruded plates comprising at least, a first pultruded plate, a second pultruded plate and a third pultruded plate, the second pultruded plate being disposed above the first pultruded plate and the third pultruded plate being disposed above the second pultruded plate, wherein each one of the first, the second and the third pultruded plates comprises at least one electrically conductive region, wherein the first, the second and the third pultruded plates define a longitudinal direction of the wind turbine blade;
        at least one first inter-plate conductive sheet disposed between the first pultruded plate and the second pultruded plate; at least one second inter-plate conductive sheet disposed between the second pultruded plate and the third pultruded plate;
    wherein the third pultruded plate is partially disposed above the second pultruded plate and comprises at least one end followed by an end area in the longitudinal direction of the wind turbine blade; and
    wherein the at least one first inter-plate conductive sheet and the at least one second inter-plate conductive sheet are disposed in contact with the at least one electrically conductive region of the first pultruded plate and the second pultruded plate respectively, in areas corresponding, in a first transversal direction of the wind turbine blade being perpendicular to the longitudinal direction, to the end area of the third pultruded plate.

Optionally, the spar cap assembly further comprises at least one additional inter-plate conductive sheet at least partially disposed above the third pultruded plate, wherein the at least one additional inter-plate conductive sheet is disposed in contact with the at least one electrically conductive region of the third pultruded plate in the end area of the third pultruded plate.

Preferably, the pultruded plates comprise a central peel ply region and two distal regions adjacent to the central peel ply region, wherein the two distal regions are electrically conductive regions in the sense of the at least one electrically conductive region as defined above.

Also preferably, the pultruded plates comprise a central peel ply region and two distal regions adjacent to the central peel ply region, wherein the central peel ply region and the two distal regions are electrically conductive regions in the sense of the at least one electrically conductive region as defined above since the central peel ply region has been previously sanded to remove the resin attached during the pultrusion manufacturing process, i.e., configuring a sanded central peel ply region.

Preferably, the at least one first inter-plate conductive sheet and the at least one second inter-plate conductive sheet are disposed at least partially between the first pultruded plate and the second pultruded plate, and the second pultruded plate and the third pultruded plate, respectively, along a second transversal direction of the wind turbine blade being perpendicular to the longitudinal direction.

This solution prevents voltage differences between carbon pultruded plates and provides a homogeneous current distribution along discrete cross-section.

Optionally, the at least one additional inter-plate conductive sheet is also at least partially disposed above any of the first pultruded plate, the second pultruded plate or both of them.

The electrical connection system for a wind turbine blade so constituted allows sharing the current between all conductors, in order to avoid voltage differences between them, avoiding internal sparks between pultruded plates.

Embodiments of the invention also relate to a method for electrically connecting conductive caps in a wind turbine blade which comprises:

a step of disposing, at least, a second pultruded plate above a first pultruded plate and a third pultruded plate above the second pultruded plate, wherein the first, the second and the third pultruded plates define a longitudinal direction of the wind turbine blade;

a step of disposing at least one first inter-plate conductive sheet between the first pultruded plate and the second pultruded plate;

a step of disposing a second inter-plate conductive sheet between the second pultruded plate and the third pultruded plate;

wherein the step of disposing the third pultruded plate above the second pultruded plate is carried out partially disposing the third pultruded plate above the second pultruded plate; and wherein the method further comprises a step of disposing in contact the at least one first inter-plate conductive sheet and the at least one second inter-plate conductive sheet with at least one conductive region of the first pultruded plate and the second pultruded plate respectively, in areas corresponding, in a first transversal direction of the wind turbine blade being perpendicular to the longitudinal direction, to an end area of the third pultruded plate.

Optionally, the method further comprises a step of at least partially disposing at least one additional inter-plate conductive sheet above the third pultruded plate; and a step of disposing in contact at least one additional inter-plate conductive sheet with the third pultruded plate in the end area of the third pultruded plate.

As one conductor (third pultruded plate) is added to an existing structure (first and second pultruded plates), it is carried out an electrical connection between the two existing conductors (first and second pultruded plates) and the new conductor (third pultruded plate). In case that this electrical connection is not done or not done properly, an "electric arc" will occur which can damage the structure. The described solution in the method of embodiments of the present invention performs a proper electrical connection to avoid "electric arc" between the components.

This solution is based on connecting the pultruded plate with the existing pultruded plates, as the current density shall be balanced according to the individual cross-sections of all the conductors involved.

Current densities in the previously existing pultruded plates (first and second pultruded plates) need to be balanced since a new pultruded plate (third pultruded plate) is added. This is carried out in the in the region corresponding to the at least one end of the third pultruded plate in the longitudinal direction of the wind turbine blade, by means of the step of disposing in contact the at least one first inter-plate conductive sheet and the at least one second inter-plate conductive sheet with the at least one conductive region of the first pultruded plate and the second pultruded plate respectively, in areas corresponding, in a first transversal direction of the wind turbine blade being perpendicular to the longitudinal direction, to an end area of the third pultruded plate.

Preferably, the step of disposing, at least, the second pultruded plate above the first pultruded plate and the third pultruded plate above the second pultruded plate is carried out disposing at least partially the at least one first inter-plate conductive sheet and the at least one second inter-plate conductive sheet between the first pultruded plate and the second pultruded plate, and the second pultruded plate and the third pultruded plate, respectively, along a second transversal direction of the wind turbine blade being perpendicular to the longitudinal direction.

Optionally, the method further comprises a step of at least partially disposing the at least one additional inter-plate conductive sheet above any of the first pultruded plate, the second pultruded plate or both of them.

BRIEF DESCRIPTION

Some of the embodiments will be described in detail, with references to the following Figures, wherein like designations denote like members, wherein:

FIG. 1 shows a spar cap of the system of embodiments of the present invention;

FIG. 2 shows a cross-section of a first embodiment of a pultruded plate of the at least one set of carbon pultruded plates of the electrical connection system for a wind turbine blade of embodiments of the present invention;

FIG. 3 shows a cross-section of a second embodiment of a pultruded plate of the at least one set of carbon pultruded plates of the electrical connection system for a wind turbine blade of embodiments of the present invention;

FIG. 4 shows a partial cross-section DD' of FIG. 1 according to the pultruded plates shown in FIG. 2;

FIG. 5 shows a partial cross-section DD' of FIG. 1 according to the pultruded plates shown in FIG. 3;

FIG. 6 shows a detail H of FIG. 1, wherein the at least one additional inter-plate conductive sheet is at least partially disposed above the third pultruded plate and above the second pultruded plate and the third pultruded plate comprises a chamfered area disposed at least at one end of the third pultruded plate;

FIG. 7 shows a detail H of FIG. 1, wherein the at least one additional inter-plate conductive sheet is at least partially disposed above the third pultruded plate and above the second pultruded plate and the third pultruded plate comprises a planar area disposed at least at one end of the third pultruded plate;

Figure 8A:
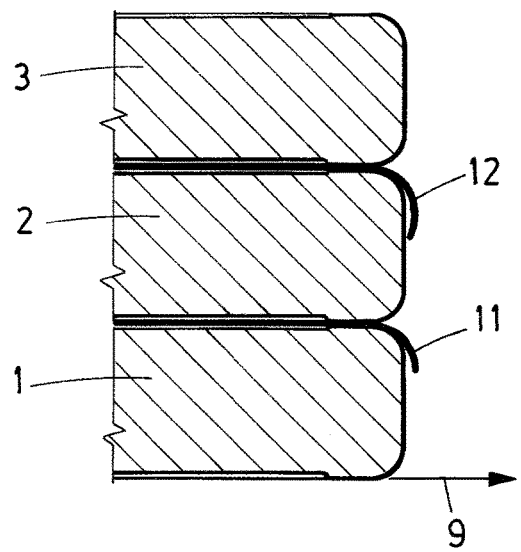
FIG. 8a shows a partial cross-section EE' of FIG. 7 according to the pultruded plates shown in FIG. 2, wherein a first embodiment of the at least one additional inter-plate conductive sheet, together with the first inter-plate conductive sheet and the second inter-plate conductive sheet are shown.
Figure 8B:
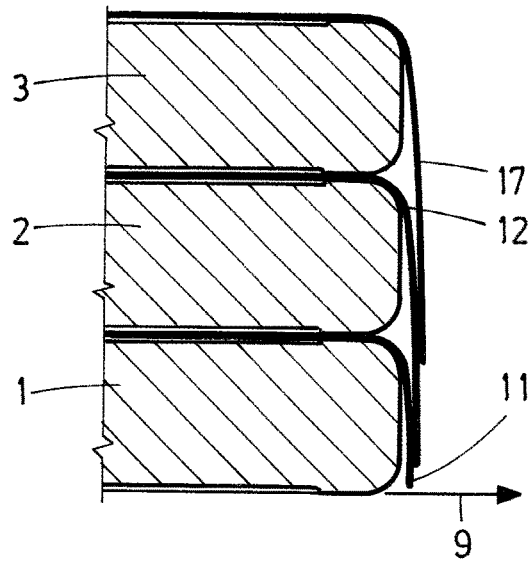
FIG. 8b shows a partial cross-section EE' of FIG. 7 according to the pultruded plates shown in FIG. 2, wherein a second embodiment of the at least one additional inter-plate conductive sheet, together with the first inter-plate conductive sheet and the second inter-plate conductive sheet are shown.
Figure 8C:
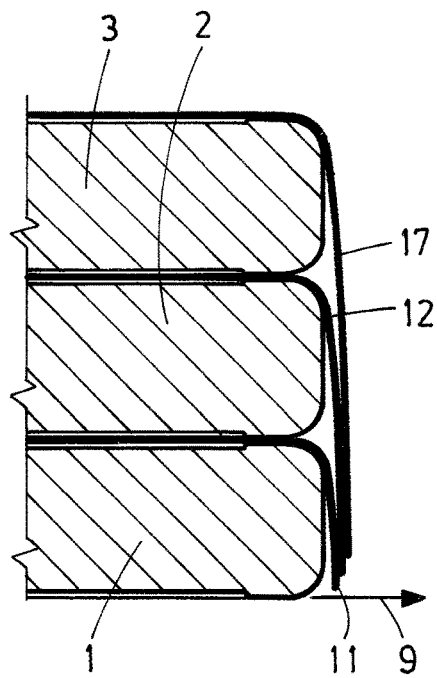
FIG. 8c shows a partial cross-section EE' of FIG. 7 according to the pultruded plates shown in FIG. 2, wherein a third embodiment of the at least one additional inter-plate conductive sheet, together with the first inter-plate conductive sheet and the second inter-plate conductive sheet are shown.
Figure 8D:
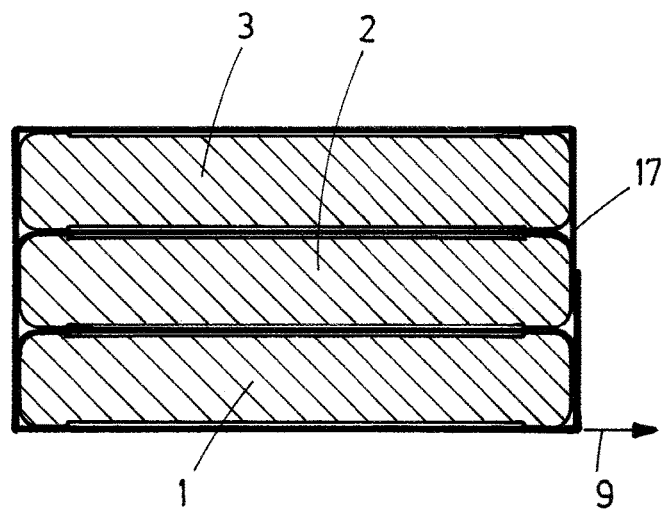
Figure 9A:
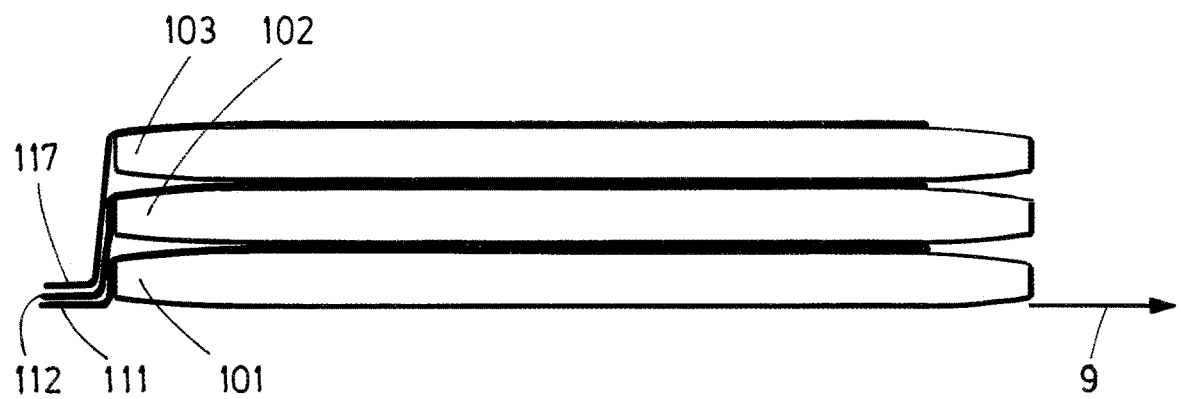
Figure 9B:
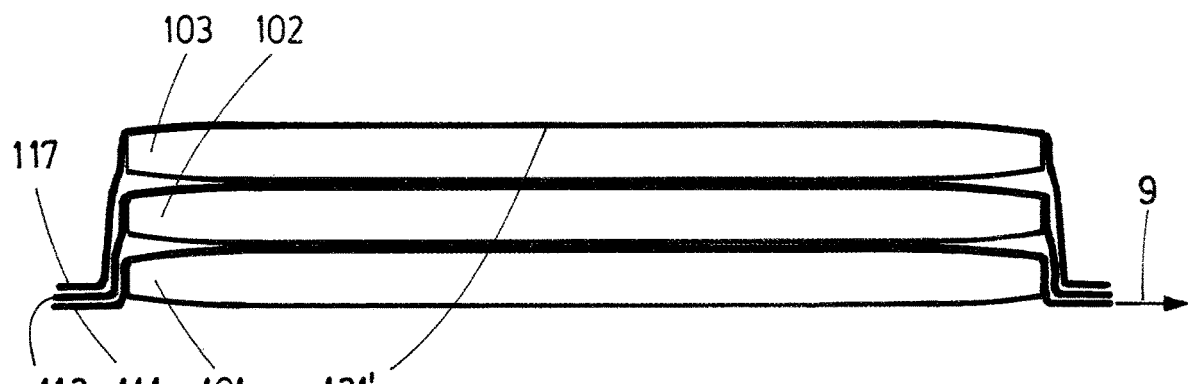

FIG. 8d shows a partial cross-section EE' of FIG. 7 according to the pultruded plates shown in FIG. 2, wherein a fourth embodiment of the at least one additional inter-plate conductive sheet, together with the first inter-plate conductive sheet and the second inter-plate conductive sheet are shown; and FIG. 9a shows a partial cross-section EE' of FIG. 7 according to the pultruded plates shown in FIG. 3, wherein a first embodiment of the at least one additional inter-plate conductive sheet, together with the first inter-plate conductive sheet and the second inter-plate conductive sheet are shown; and FIG. 9b shows a partial cross-section EE' of FIG. 7 according to the pultruded plates shown in FIG. 3, wherein a second embodiment of the at least one additional inter-plate conductive sheet, together with the first inter-plate conductive sheet and the second inter-plate conductive sheet are shown;

DETAILED DESCRIPTION

In embodiments of the invention, the electrical connection system for a wind turbine blade comprises:
a spar cap assembly which in turn comprises:
at least one set of carbon pultruded plates comprising at least, a first pultruded plate (1, 101), a second pultruded plate (2, 102) and a third pultruded plate (3, 103), the second pultruded plate (2, 102) being disposed above the first pultruded plate (1, 101) and the third pultruded plate (3, 103) being disposed above the second pultruded plate (2, 102), wherein each one of the first (1, 101), the second (2, 102) and the third (3, 103) pultruded plates comprises at least one electrically conductive region (22, 122, 21', 121'), wherein the first (1, 101), the second (2, 102) and the third (3, 103) pultruded plates define a longitudinal direction (8) of the wind turbine blade;
at least one first inter-plate conductive sheet (11, 111) disposed between the first pultruded plate (1, 101) and the second pultruded plate (2, 102); at least one second inter-plate conductive sheet (12, 112) disposed between the second pultruded plate (2, 102) and the third pultruded plate (3, 103);
wherein the third pultruded plate (3, 103) is partially disposed above the second pultruded plate (2, 102) and comprises at least one end (28, 128) followed by an end area (27, 127, 29, 129) in the longitudinal direction (8) of the wind turbine blade; and
wherein the at least one first inter-plate conductive sheet (1, 101) and the at least one second inter-plate conductive sheet (2, 102) are disposed in contact with the at least one electrically conductive region (22, 122, 21', 121') of the first pultruded plate (1, 101), the second pultruded plate (2, 102) and the third pultruded plate (3, 103) respectively, in areas (27', 127', 29', 129') corresponding, in a first transversal direction (10) of the wind turbine blade being perpendicular to the longitudinal direction (8), to the end area (27, 127, 29, 129) of the third pultruded plate (3, 103).

The spar cap assembly further comprises at least one additional inter-plate conductive sheet (17, 117) at least partially disposed above the third pultruded plate (3, 103) and the at least one additional inter-plate conductive sheet (17, 117) is disposed in contact with the at least one electrically conductive region (22, 122) of the third pultruded plate (3, 103) in the end area (27, 127, 29, 129) of the third pultruded plate (3, 103).

Optionally, the spar cap assembly comprises multiple parallel sets of carbon pultruded plates comprising each set at least, a first pultruded plate (1, 101), a second pultruded plate (2, 102) and a third pultruded plate (3, 103), the second pultruded plate (2, 102) being disposed above the first pultruded plate (1, 101) and the third pultruded plate (3, 103) being disposed above the second pultruded plate (2, 102), wherein each one of the first (1, 101), the second (2, 102) and the third (3, 103) pultruded plates comprises at least one electrically conductive region (22, 122, 21', 121'), wherein the first (1, 101), the second (2, 102) and the third (3, 103) pultruded plates define a longitudinal direction (8) of the wind turbine blade.

FIG. 2 shows a cross-section of a first embodiment of a pultruded plate of the at least one set of carbon pultruded plates of the electrical connection system for a wind turbine blade of embodiments of the present invention.

According to this first embodiment, the pultruded plates (1, 2, 3) comprise a central peel ply region (21) and two distal regions (22) adjacent to the central peel ply region, wherein the central peel ply region comprises a first thickness lower than a second thickness of the two distal regions. The two distal regions (22) are electrically conductive regions, whereas the central peel ply region (21) is a non-conductive region since once a peel-ply sheet is removed (produced during manufacturing such as by protrusion), an insulation layer is obtained in the peel ply region (21), about 150 μm depth.

The at least one first inter-plate conductive sheet (11) disposed between the first pultruded plate (1) and the second pultruded plate (2) and the at least second inter-plate conductive sheet (12) disposed between the second pultruded plate (2) and the third pultruded plate (3) for this first embodiment of pultruded plates (1, 2, 3) comprises a width larger than a width of the central peel ply region (21), assuring the contact between the inter-plate conductive sheet (11, 12) being disposed between the pultruded plates (1, 2, 3).

FIG. 3 shows a cross-section of a second embodiment of a pultruded plate (101, 102, 103) of the at least one set of carbon pultruded plates of the electrical connection system for a wind turbine blade of embodiments of the present invention.

According to this second embodiment, the pultruded plates (101, 102, 103) comprise a central peel ply region (121) and two distal regions (122) adjacent to the central peel ply region (121), wherein the central peel ply region (121) comprises a first thickness larger than a second thickness of the two distal regions (122), wherein the second thickness is decreasing from the central peel ply (121) region to a lateral side (123) of the pultrude plate (101, 102, 103). The two distal regions (122) are electrically conductive regions, whereas the central peel ply region (121) is a non-conductive region since a peel-ply sheet is removed (produced during manufacturing such as by protrusion).

The at least one first inter-plate conductive sheet (111) disposed between the first pultruded plate (101) and the second pultruded plate (102) and the at least second inter-plate conductive sheet (112) disposed between the second pultruded plate (102) and the third pultruded plate (103) for this first embodiment of pultruded plates (101, 102, 103) comprises a width larger than a width of the central peel ply region (121), plus a width of at least one of the two distal regions (122), plus a width corresponding at least to twice the thickness of the pultruded plate (103, 102), assuring the contact between at least one first inter-plate conductive sheet (111) and the at least second inter-plate conductive sheet (112).

The at least one first inter-plate conductive sheet (11, 111) and the at least one second inter-plate conductive sheet (12, 121) are disposed at least partially between the first pultruded plate (1, 101) and the second pultruded plate (2, 102), and the second pultruded plate (2, 102) and the third pultruded plate (3, 103), respectively, along a second transversal direction (9) of the wind turbine blade being perpendicular to the longitudinal direction (8), for both embodiments of the pultruded plates (1, 2, 3, 101, 102, 103). The at least one first inter-plate conductive sheet (11, 111) and the at least one second inter-plate conductive sheet (12, 121) are disposed along predetermined separated stretches of the longitudinal direction (8) of the blade, being the length of each stretch of 200 mm and meeting the condition that one stretch is disposed at two end areas of the first pultruded plate (1, 101) and the second pultruded plate (2, 102) defined in the longitudinal direction (8) of the wind turbine blade.

In an embodiment shown in FIG. 6, the end area of the third pultruded plate (3, 103) which follows the at least at one end (28, 128) is a chamfered area (27, 127).

Also, in another embodiment shown in FIG. 7, the end area of the third pultruded plate (3, 103) which follows the at least at one end (28, 128) is a planar area (29, 129). The planar area (29, 129) has been previously sanded to remove the resin attached during the pultrusion manufacturing process, i.e., configuring a sanded planar area (29, 129).

For both embodiments of the third pultruded plate (3, 103) shown in FIGS. 6 and 7, the end area, being the chamfered area (27, 127) or the sanded planar area (29, 129) comprises a length included in the interval of about or between 50 mm to 1000 mm, an alternate length included in the interval is about or between 100 mm to 500 mm.

For the embodiments shown in FIGS. 6 and 7, the at least one additional inter-plate conductive sheet (17, 117) is disposed above the chamfered area (27, 127) or the sanded planar area (29, 129) of the third pultruded plate (3, 103) and above a first area (26, 126) of the third pultruded plate (3, 103) adjacent to the chamfered area (27, 127) or the sanded planar area (29, 129). The at least one additional inter-plate conductive sheet (17, 117) is also at least partially disposed above a second area (25, 125) of the second pultruded plate (2, 102), for both embodiments of the pultruded plates (1, 2, 3, 101, 102, 103), adjacent to the chamfered area (27, 127) or the sanded planar area (29, 129). The first area (26, 126) of the third pultruded plate (3, 103) adjacent to the chamfered area (27, 127) or the sanded planar area (29, 129) and the second area (25, 125) of the second pultruded plate (2, 102), for both embodiments of the pultruded plates (1, 2, 3, 101, 102, 103), adjacent to the chamfered area (27, 127) comprise a length included in the interval of about or between 0 mm to 1000 mm, an alternate length included in the interval is about or between 100 mm to 500 mm.

In this way, an electrical connection between the first pultruded plate (1, 101), the second pultruded plate (2, 102) and the third pultruded plate (3, 103) is established, avoiding an electric arc between them which can damage the spar cap assembly and in consequence the electrical connection system for a wind turbine blade.

FIGS. 8a to 8d show a partial cross-section EE' of FIG. 7 according to the pultruded plates shown in FIG. 2, wherein several embodiments of the at least one additional inter-plate conductive sheet (17) only for the embodiments of FIGS. 8b to 8d, together with the first inter-plate conductive sheet (11) and the second inter-plate conductive sheet (12) and their respective pultruded plates are shown.

In FIG. 8a, there is no physical contact between the first inter-plate conductive sheet (11) and the second inter-plate conductive sheet (12), since the first inter-plate conductive sheet (11) and the second inter-plate conductive sheet (12) comprise a width substantially equal to the width of the central peel ply region (21), plus a width of at least one of the two distal regions (22).

In FIG. 8b, there is physical contact between the first inter-plate conductive sheet (11) and the second inter-plate conductive sheet (12) and between the second inter-plate conductive sheet (12) and at least one additional inter-plate conductive sheet (17), since the second inter-plate conductive sheet (12) and the at least one additional inter-plate conductive sheet (17) comprise a width substantially equal to the width of the central peel ply region (21), plus a width of at least one of the two distal regions (22), plus a width corresponding at least to twice the thickness of the pultruded plate (3, 2), and the first inter-plate conductive sheet (11) comprises a width substantially equal to the width of the central peel ply region (21), plus a width of at least one of the two distal regions (22), plus a width corresponding at least to the thickness of the first pultruded plate (1). Thus, an inter-plate conductive sheet overlaps the inter-plate conductive sheet disposed below it.

In FIG. 8c, there is physical contact between the first inter-plate conductive sheet (11) and the second inter-plate conductive sheet (12) and between the second inter-plate conductive sheet (12) and the at least one additional inter-plate conductive sheet (17), since the first inter-plate conductive sheet (11) comprises a width substantially equal to the width of the central peel ply region (21), plus a width of at least one of the two distal regions (22), plus a width corresponding at least to the thickness of the first pultruded plate (1), the second inter-plate conductive sheet (12) comprises a width substantially equal to the width of the central peel ply region (21), plus a width of at least one of the two distal regions (22), plus a width corresponding at least to twice the thickness of the pultruded plate (2, 1), and the at least one additional inter-plate conductive sheet (17) comprises a width substantially equal to the width of the central peel ply region (21), plus a width of at least one of the two distal regions (22), plus a width corresponding at least to three times the thickness of the pultruded plate (3, 2, 1). Thus, an inter-plate conductive sheet overlaps all the inter-plate conductive sheets disposed below it.

In FIG. 8d, there is physical contact between the first inter-plate conductive sheet (11) and the second interconductive sheet (12), between the second inter-plate conductive sheet (12) and the at least one additional inter-plate conductive sheet (17), since the first inter-plate conductive sheet (11) comprises a width substantially equal to the width of the central peel ply region (21), plus a width of at least one of the two distal regions (22), plus a width corresponding at least to the thickness of the first pultruded plate (1), the second inter-plate conductive sheet (12) comprises a width substantially equal to the width of the central peel ply region (21), plus a width of at least one of the two distal regions (22), plus a width corresponding at least to twice the thickness of the pultruded plate (2, 1), and the at least one additional inter-plate conductive sheet (17) wraps the first inter-plate conductive sheet (11), the second inter-plate conductive sheet (12) and the at least one additional inter-plate conductive sheet (17) and comprises a width substantially equal to twice the width of the central peel ply region (21), plus a width corresponding at least to four time one of the distal regions (22), plus a width corresponding at least to six times the thickness of the pultruded plate (3, 2, 1).

FIGS. 9*a* and 9*b* show a partial cross-section EE' of FIG. 7 according to the pultruded plates shown in FIG. 3, wherein several embodiments of the at least one additional inter-plate conductive sheet (117), together with the first inter-plate conductive sheet (111) and the second inter-plate conductive sheet (112) are shown.

In FIG. 9*a*, there is physical contact between the first inter-plate conductive sheet (111) and the second inter-plate conductive sheet (112), and between the second inter-plate conductive sheet (112) and the at least one additional inter-plate conductive sheet (117), since the first inter-plate conductive sheet (111) comprises a width substantially equal to the width of the central peel ply region (121), plus a width of at least one of the two distal regions (122), plus a width corresponding at least to the thickness of the first pultruded plate (11), the second inter-plate conductive sheet (112) comprises a width substantially equal to the width of the central peel ply region (21), plus a width of at least one of the two distal regions (122), plus a width corresponding at least to twice the thickness of the pultruded plate (102, 101), and the at least one additional inter-plate conductive sheet (117) comprises a width substantially equal to the width of the central peel ply region (121), plus a width of at least one of the two distal regions (122), plus a width corresponding at least to three times the thickness of the pultruded plate (103, 102, 101). Thus, an inter-plate conductive sheet overlaps all the inter-plate conductive sheets disposed below it at one a lateral side (123) of the pultrude plates.

In FIG. 9*b*, there is physical contact between the first inter-plate conductive sheet (111) and the second inter-plate conductive sheet (112), and between the second inter-plate conductive sheet (112) and the at least one additional inter-plate conductive sheet (117), since the first inter-plate conductive sheet (111) comprises a width substantially equal to the width of the central peel ply region (121), plus a width of at least two of the two distal regions (122), plus a width corresponding at least to twice the thickness of the first pultruded plate (11), the second inter-plate conductive sheet (112) comprises a width substantially equal to the width of the central peel ply region (21), plus a width of at least two of the two distal regions (122), plus a width corresponding at least to four times the thickness of the pultruded plate (102, 101), and the at least one additional inter-plate conductive sheet (117) comprises a width substantially equal to the width of the central peel ply region (121), plus a width of at least two of the two distal regions (122), plus a width corresponding at least to six times the thickness of the pultruded plate (103, 102, 101). Thus, an inter-plate conductive sheet overlaps all the inter-plate conductive sheets disposed below it at both lateral sides (123) of the pultruded plates.

Another variant of the embodiments of FIGS. 8*a* to 8*d*, 9*a* and 9*b*, is included hereby by reference, wherein an additional carbon pultruded plate (7, 107) is disposed below the first pultruded plate (1, 101).

Embodiments of the invention also relate to a method for electrically connecting conductive caps in a wind turbine blade which comprises:

a step of disposing, at least, a second pultruded plate (2, 102) above a first pultruded plate (1, 101) and a third pultruded plate (3, 103) above the second pultruded plate (2, 102), wherein the first (1, 101), the second (2, 102) and the third pultruded plates (3, 103) define a longitudinal direction (8) of the wind turbine blade;

a step of disposing at least one first inter-plate conductive sheet (11, 111) between the first pultruded plate (1, 101) and the second pultruded plate (2, 102); and a step of disposing a second inter-plate conductive sheet (12, 112) between the second pultruded plate (2, 102) and the third pultruded plate (3, 103)

wherein the step of disposing the third pultruded plate (3, 103) above the second pultruded plate (2, 102) is carried out partially disposing the third pultruded plate (3, 103) above the second pultruded plate (2, 102); and wherein the method further comprises a step of disposing in contact the at least one first inter-plate conductive sheet (11, 111) and the at least one second inter-plate conductive sheet (12, 112) with at least one conductive region (22, 122) of the first pultruded plate (1, 101) and the second pultruded plate (2, 102) respectively, in areas (27', 127', 29', 129') corresponding, in a first transversal direction (10) of the wind turbine blade being perpendicular to the longitudinal direction (8), to an end area (27, 127, 29, 129) of the third pultruded plate (3, 103).

The method further comprises a step of at least partially disposing at least one additional inter-plate conductive sheet (17, 117) above the third pultruded plate (3, 103) and a step of disposing in contact the at least one additional inter-plate conductive sheet (17, 117) with the third pultruded plate (3, 103) in the end area (27, 127, 29, 129) of the third pultruded plate (3, 103).

The step of disposing, at least, the second pultruded plate (2, 102) above the first pultruded plate (1, 101) and the third pultruded plate (3, 103) above the second pultruded plate (2, 102) is carried out disposing at least partially the at least one first inter-plate conductive sheet (11, 111) and the at least one second inter-plate conductive sheet (12, 112) between the first pultruded plate (1, 101) and the second pultruded plate (2, 102), and the second pultruded plate (2, 102) and the third pultruded plate (3, 103), respectively, along a second transversal direction (9) of the wind turbine blade being perpendicular to the longitudinal direction (8). The step of disposing, at least, the second pultruded plate (2, 102) above the first pultruded plate (1, 101) and the third pultruded plate (3, 103) above the second pultruded plate (2, 102) is carried out disposing the at least one first inter-plate conductive sheet (11, 111) and the at least one second inter-plate conductive sheet (12, 121) along predetermined separated stretches of the longitudinal direction (8) of the blade, being the length of each stretch of 200 mm and meeting the condition that one stretch is disposed at two end areas of the first pultruded plate (1, 101) and the second pultruded plate (2, 102) defined in the longitudinal direction (8) of the wind turbine blade.

The step of at least partially disposing the at least one additional inter-plate conductive sheet (17, 117) above the third pultruded plate (3, 103) is carried out disposing the additional inter-plate conductive sheet (17, 117) above the end area (27, 127, 29, 129) of the third pultruded plate (3, 103), being a chamfered area (27, 127) or a sanded planar area (29, 129) and above a first area (26, 126) of the third pultruded plate (3, 103) adjacent to the end area (27, 127, 29, 129) and at least partially disposing the at least one additional inter-plate conductive sheet (17, 117) above a second area (25, 125) of the second pultruded plate (2, 102), adjacent to the end area (27, 127, 29, 129).

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. An electrical connection system for a wind turbine blade which comprises:
   at least one set of carbon pultruded plates comprising at least, a first pultruded plate, a second pultruded plate and a third pultruded plate, the second pultruded plate being disposed above the first pultruded plate and the third pultruded plate being disposed above the second pultruded plate, wherein each one of the first, the second and the third pultruded plates comprises at least one electrically conductive region, wherein the first, the second and the third pultruded plates define a longitudinal direction of the wind turbine blade, wherein at least one of the pultruded plates comprises a central peel ply region and two distal regions adjacent to the central peel ply region, wherein the two distal regions are electrically conductive regions, and wherein the central peel ply region is a non-conductive region;
   at least one first inter-plate conductive sheet disposed between the first pultruded plate and the second pultruded plate;
   at least one second inter-plate conductive sheet disposed between the second pultruded plate and the third pultruded plate;
   wherein the third pultruded plate is partially disposed above the second pultruded plate and comprises at least one end followed by an end area in the longitudinal direction of the wind turbine blade; and
   wherein the at least one first inter-plate conductive sheet is disposed in contact with the at least one electrically conductive region of the first pultruded plate and the at least one second inter-plate conductive sheet is disposed in contact with the at least one electrically conductive region of the second pultruded plate and the third pultruded plate in areas corresponding, in a first transversal direction of the wind turbine blade being perpendicular to the longitudinal direction, to the end area of the third pultruded plate such that an electrical connection between the first pultruded plate, the second pultruded plate, and the third pultruded plate is established.

2. The electrical connection system for a wind turbine blade according to claim 1, further comprising at least one additional inter-plate conductive sheet at least partially disposed above the third pultruded plate wherein the at least one additional inter-plate conductive sheet is disposed in contact with the at least one electrically conductive region of the third pultruded plate in the end area of the third pultruded plate.

3. The electrical connection system for a wind turbine blade according to claim 1, wherein each of the pultruded plates comprise a respective central peel ply region and two respective distal regions adjacent to the respective central peel ply region.

4. The electrical connection system for a wind turbine blade according to claim 1, wherein the pultruded plates comprise a central peel ply region and two distal regions adjacent to the central peel ply region, wherein the central peel ply region and the two distal regions are electrically conductive regions, wherein the central peel ply region is a sanded central peel ply region.

5. The electrical connection system for a wind turbine blade according to claim 1, wherein the at least one first inter-plate conductive sheet and the at least one second inter-plate conductive sheet are disposed at least partially between the first pultruded plate and the second pultruded plate, and the second pultruded plate and the third pultruded plate, respectively, along a second transversal direction of the wind turbine blade being perpendicular to the longitudinal direction.

6. The electrical connection system for a wind turbine blade according to claim 2, wherein the at least one additional inter-plate conductive sheet is also at least partially disposed above any of the first pultruded plate, the second pultruded plate or both of them.

7. The electrical connection system for a wind turbine blade according to claim 1, wherein the end area of the third pultruded plate which follows the at least at one end is a chamfered area.

8. The electrical connection system for a wind turbine blade according to claim 1, wherein the end area of the third pultruded plate which follows the at least at one end is a sanded planar area.

9. The electrical connection system for a wind turbine blade according to claim 7, wherein the end area comprises a length of about or between 50 mm to 1000 mm.

10. A wind turbine comprising at least a wind turbine blade comprising the electrical bonding system according to claim 1.

11. The electrical connection system for a wind turbine blade according to claim 7, wherein the end area comprises a length of between 100 mm to 500 mm.

12. The electrical connection system for a wind turbine blade according to claim 1, wherein there is physical contact between the first inter-plate conductive sheet and the second inter-plate conductive sheet.

13. The electrical connection system for a wind turbine blade according to claim 2, wherein there is physical contact between the second inter-plate conductive sheet and the at least one additional inter-plate sheet.

14. The electrical connection system for a wind turbine blade according to claim 2, wherein there is physical contact between the first inter-plate conductive sheet and the second inter-plate conductive sheet, and wherein there is contact between the second inter-plate conductive sheet and the at least one additional inter-plate sheet.

15. The electrical connection system for a wind turbine blade according to claim 2, wherein each respective inter-plate conductive sheet extends downward to at least partially overlap all respective inter-plate sheets below it.

16. A method for electrically connecting conductive caps in a wind turbine blade which comprises: disposing, at least, a second pultruded plate above a first pultruded plate and a third pultruded plate above the second pultruded plate, wherein the first, the second and the third pultruded plates define a longitudinal direction of the wind turbine blade, wherein at least one of the pultruded plates comprises a central peel ply region and two distal regions adjacent to the central peel ply region, wherein the two distal regions are electrically conductive regions, and wherein the central peel ply region is a non-conductive region;

disposing at least one first inter-plate conductive sheet between the first pultruded plate and the second pultruded plate;

disposing a second inter-plate conductive sheet between the second pultruded plate and the third pultruded plate;

wherein the disposing the third pultruded plate above the second pultruded plate is carried out partially disposing the third pultruded plate above the second pultruded plate; and wherein the method further comprises disposing in contact the at least one first inter-plate conductive sheet and the at least one second inter-plate conductive sheet with at least one conductive region of the first pultruded plate and the second pultruded plate respectively, in areas corresponding, in a first transversal direction of the wind turbine blade being perpendicular to the longitudinal direction, to an end area of the third pultruded plate such that an electrical connection between the first pultruded plate, the second pultruded plate, and the third pultruded plate is established.

17. The method for electrically connecting conductive caps in a wind turbine blade according to claim 16, further comprising at least partially disposing at least one additional inter-plate conductive sheet above the third pultruded plate and disposing in contact the at least one additional inter-plate conductive sheet with the third pultruded plate in the end area of the third pultruded plate.

18. The method for electrically connecting conductive caps in a wind turbine blade according to claim 16, wherein disposing, at least, the second pultruded plate above the first pultruded plate and the third pultruded plate above the second pultruded plate is carried out disposing at least partially the at least one first inter-plate conductive sheet and the at least one second inter-plate conductive sheet between the first pultruded plate and the second pultruded plate, and the second pultruded plate and the third pultruded plate, respectively, along a second transversal direction of the wind turbine blade being perpendicular to the longitudinal direction.

19. The method for electrically connecting conductive caps in a wind turbine blade according to claim 18, wherein disposing, at least, the second pultruded plate above the first pultruded plate and the third pultruded plate above the second pultruded plate is carried out disposing the at least one first inter-plate conductive sheet and the at least one second inter-plate conductive sheet along separated sections of the longitudinal direction of the blade, wherein one stretch is disposed at two end areas of the first pultruded plate and the second pultruded plate defined in the longitudinal direction of the wind turbine blade.

20. The method for electrically connecting conductive caps in a wind turbine blade according to claim 17, wherein at least partially disposing the at least one additional inter-plate conductive sheet above the third pultruded plate is carried out disposing the additional inter-plate conductive sheet above the end area of the third pultruded plate, being a chamfered area or a sanded planar area and above a first area of the third pultruded plate adjacent to the end area and at least partially disposing the at least one additional inter-plate conductive sheet above a second area of the second pultruded plate, adjacent to the end area.

\* \* \* \* \*